Jan. 12, 1932.                D. K. TRESSLER                1,840,798
                           PREPARATION OF EXTRACTS
                              Filed Sept. 5, 1930
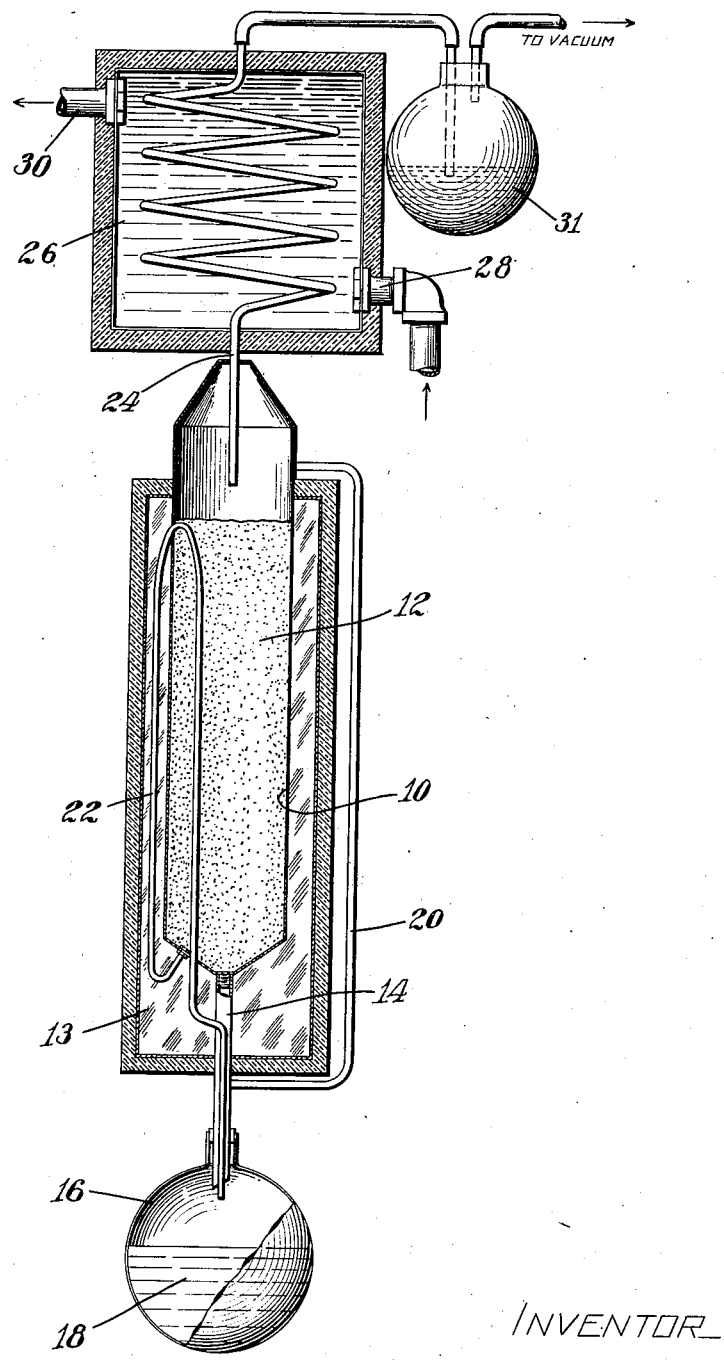
INVENTOR
Donald K. Tressler Patented Jan. 12, 1932

1,840,798

UNITED STATES PATENT OFFICE

DONALD K. TRESSLER, OF GLOUCESTER, MASSACHUSETTS, ASSIGNOR TO FROSTED FOODS COMPANY, INC., OF DOVER, DELAWARE, A CORPORATION OF DELAWARE

PREPARATION OF EXTRACTS

Application filed September 5, 1930. Serial No. 479,883.

This invention relates to the preparation of extracts from vegetable products, using the term "vegetable" in its broader sense to include fruits, berries and all products of vegetable growth. In one aspect it consists in an improved process whereby extracts of high quality may be prepared from such products which have heretofore been difficult of treatment without impairing the natural fresh flavor of the extract. A case in point is the extract of strawberry flavor. This is unfavorably affected by exposure of the berries or the material in process to any substantial degree of heat. It is not soluble in various volatile solvents which might otherwise be employed and is of such delicacy that substantial concentration is desirable.

I have discovered that an extract of superior quality may be prepared by a process carried out under relatively low temperature which is characterized by first reducing the product, as in the case of fresh fruit for instance, to a comminuted mass and then treating the mass with a suitable solvent, such as alcohol, by which the extract may be dissolved without requiring additional heat and then separated from its solution at or below room temperature without noticeable change of taste or impairment of any kind.

Satisfactory results may be secured in some cases by freezing the raw product and treating the comminuted frozen mass with the solvent, thus carrying out the whole process at a lower temperature than otherwise. A process so characterized possesses also the advantage of dealing with a somewhat granular, loosely-compacted and dry material through which the solvent may easily percolate and from which it may be readily drained.

The process of my invention may be further facilitated by being conducted under a substantial vacuum, as in this way the vaporizing point of the solvent may be held at a low temperature. The process of my invention also lends itself to operation in a continuous cycle which is advantageous in securing the desired concentration of the extract and also because it reduces the cost of operation.

My invention also contemplates a novel apparatus by which the method of my invention may be advantageously carried out, although it will be understood that the improved process herein disclosed is not limited to this or to any specific form of apparatus. I have found, however, that apparatus is particularly well suited to the requirements of my process when it includes a column for containing the comminuted frozen material communicating with a solvent reservoir and having means for delivering a liquefied solvent to the top of the column, together with means for returning the extract-carrying solvent from the column to the reservoir and means for refrigerating the comminuted material and the condenser. As herein shown, the column is connected through a condenser to a vacuum pump, by which the whole apparatus is maintained under a substantial vacuum.

For purposes of illustration, I will describe my invention as carried out in the preparation of extract of strawberry flavor and for this purpose have shown in the accompanying drawing one form of the apparatus above discussed.

In the drawing the apparatus is shown somewhat diagrammatically in vertical section.

It will be understood that the various component parts of the illustrated apparatus are of conventional type and under commercial conditions wide variations in arrangement and installation may be desirable. As herein shown, however, a cylindrical container or column 10, supported with its axis in vertical position, is provided for the reception of the finely comminuted frozen strawberries 12. The comminuted mass may be prepared as convenient and may be first frozen either by freezing the individual berries and grinding them in a mill or by freezing the berries into a solid cake or slab and then comminuting the slab upon a rotary gang saw or the like. The container is shaped so as to maintain the comminuted mass roughly in the form of a vertical column, thus affording extended passage for the solvent, as will presently appear. The container 10 is enclosed in a heatinsulating chamber 13 which may contain any desired refrigerating medium, such as dry ice, or may be otherwise refrigerated to maintain the comminuted frozen mass of strawberries at a temperature below their melting point.

The container 10 is sealed at its lower end and secured to a downwardly-extending pipe 14 which opens into a flask 16 originally containing the liquid solvent, in this case ethyl alcohol, and eventually to contain the concentrated solution of strawberry extract in alcohol. From one side of the pipe 14 leads a vapor pipe 20 which enters the upper part of the container 10 above the frozen mass. A siphon tube 22 leads out of the bottom of the container, then upwardly in a loop extending substantially to the top of the frozen mass in the container and then downwardly, discharging into the flask 16. A condenser pipe 24 is led from the top of the container 10 through a condenser 26, to which cold brine is supplied by a pipe 28 and from which it is discharged through a pipe 30 leading from the upper part of the condenser. The condenser pipe 24 extends through suitable connections to a vacuum pump by which the interior of the container 10, the flask 16 and its connections are maintained under any desired degree of vacuum.

Having filled the container 10 with the comminuted frozen strawberries, the vacuum pump is started, whereupon the pressure in the flask 16 drops and the alcohol therein begins to vaporize. The alcohol vapor passing upwardly from the flask 16 is carried by the vapor tube 20 to the upper part of the container 10 and enters the condenser tube 24. The alcohol vapor is condensed in the container and drips back into the upper part of the container 10 upon the comminuted mass, through which it percolates until it finds its way to the bottom of the container. This process continues until the liquid alcohol solution in the container 10 reaches the height of the upper bend of the siphon tube 22. It will be understood that the liquid alcohol in its passage through the comminuted frozen strawberry mass and in standing about the mass acts to dissolve the strawberry extract from the mass. This step of the process is carried out below the melting point of the frozen strawberry mass and while the latter remains granular and loosely packed.

When the liquid alcohol solution in the container 10 rises to a level sufficient to fill the siphon tube 22, the action of the latter is started and the alcoholic solution in the container 10 is drained into the flask 16. Vaporization of the alcohol from the solution in the flask at once begins and the container 10 is filled for a second time with liquid alcohol from the condenser. These steps of the process may be repeated a sufficient number of times to dissolve out substantially all of the strawberry extract from the comminuted frozen mass and as it proceeds, the concentration of the solution in the flask 16 is gradually built up to a point at which separation may be advantageously effected. When this is reached, the solution is drawn from the flask 16 and the extract and solvent may be separated in any desired manner, preferably by distillation under low pressure carried out at correspondingly low temperature.

While I have described my invention in its application to the preparation of extract of strawberry flavor, it may be practiced with equal advantage in the preparation of extract from raspberries or cherries and, in fact, I contemplate applying it to the preparation of extracts from berries and fruit in general, including pineapples, citrus fruits, etc.

Various changes and refinements in construction and arrangement may be desirable in the design of apparatus for carrying out the process of my invention on a commercial scale. While I have referred to alcohol as the solvent to be used, I do not wish to limit myself thereto but contemplate substituting any other suitable solvent which will not adversely affect the taste or odor of the extract.

Having thus described my invention, what I claim as new and desire to secure by Letters Patent is:

1. The process of preparing vegetable extracts which consists in freezing the vegetable, comminuting the frozen vegetable, treating the comminuted frozen vegetable while maintained continuously in a frozen state with a solvent normally boiling above room temperature to dissolve the extract, and then separating the solvent from the extract.

2. The process of preparing fruit extracts which consists in reducing the fruit to a comminuted frozen mass, treating the frozen mass with an alcohol at a temperature below the melting point of the fruit and thereby dissolving out the extract, and then separating the alcohol from the extract.

3. The process of preparing fruit extracts which consists in reducing the fruit to a comminuted frozen mass, circulating a solvent through the frozen mass to dissolve the extract while maintaining the entire system under substantial vacuum and while the mass is maintained continuously in a frozen state, and finally separating the extract and solvent.

4. The process of preparing extracts from natural products characterized by the steps of reducing the product to a frozen comminuted mass, subjecting the entire system to a substantial degree of vacuum, maintaining, in alternate liquid and vapor phase, a circulation of a solvent which includes in its path said frozen comminuted mass maintained continuously in a frozen state, thereby dissolving the extract therefrom, and finally separating the extract and solvent.

5. The process of preparing fruit extracts which consists in reducing the fruit to a comminuted frozen mass, treating said mass, below its freezing point, with a liquid alcohol to dissolve the extract therefrom, vaporizing the alcohol therefrom, condensing the vapor and passing it through the mass again, and finally separating the extract and alcohol.

6. The process of preparing fruit extracts which consists in reducing the fruit to a comminuted frozen mass, treating the mass with a liquid alcohol to dissolve the extract therefrom, draining the solution from the frozen mass, vaporizing the alcohol therefrom at a low temperature, condensing the vapor thus formed and passing it again through the previously treated frozen mass, while maintained continuously in an unmelted state, and finally separating the extract and alcohol.

7. The process of preparing fruit extracts which consists in reducing the fruit to a comminuted frozen mass, circulating a solvent through the frozen mass under a substantial degree of vacuum and in the course of such circulation vaporizing the solvent after it has passed through the frozen mass and condensing it before it returns to said frozen mass, thereby progressively dissolving out the extract, and finally separating the solvent and extract.

8. The process of preparing strawberry extract which consists in freezing and comminuting the fresh strawberries, treating the frozen berries with an alcohol, under a substantial degree of vacuum and below the melting point of the frozen berries, and subsequently separating the alcohol from the extract, thus concentrating the solution.

DONALD K. TRESSLER.